United States Patent [19]

Ohmura et al.

[11] Patent Number: 4,662,122

[45] Date of Patent: May 5, 1987

[54] NUMERICALLY CONTROLLED GRINDING MACHINE

[75] Inventors: Haruo Ohmura, Aichi; Yuji Ohba, Kariya, both of Japan

[73] Assignee: Toyoda Koki Kabushiki Kaisha, Kariya, Japan

[21] Appl. No.: 831,505

[22] Filed: Feb. 21, 1986

[30] Foreign Application Priority Data

Mar. 29, 1985 [JP] Japan .................................. 60-68055

[51] Int. Cl.⁴ .............................................. B24B 49/16
[52] U.S. Cl. ............................ 51/165.71; 51/165.77; 51/165.92
[58] Field of Search .......... 51/165.71, 165.77, 165.92, 51/165 TP, 165.75

[56] References Cited

U.S. PATENT DOCUMENTS

| | | | |
|---|---|---|---|
| 3,716,949 | 2/1973 | Price | 51/165.8 |
| 3,897,659 | 8/1975 | Henry | 51/165.92 |
| 3,909,989 | 10/1975 | Tamaki | 51/165.92 |
| 4,187,646 | 2/1980 | Smith | 51/165.77 |
| 4,498,259 | 2/1985 | Yamamoto et al. | 51/165.71 |
| 4,524,547 | 6/1985 | Heaston | 51/165.77 |

FOREIGN PATENT DOCUMENTS 40-26669 11/1965 Japan .................................. 74/A29

Primary Examiner—Harold D. Whitehead
Attorney, Agent, or Firm—Oblon, Fisher, Spivak, McClelland & Maier

[57] ABSTRACT

In a numerically controlled grinding machine of the type which is adapted to perform a machining operation on the basis of the feed amounts specified as relative amounts in various modes of different grinding wheel feed speeds, a feed controller comprising in combination: a contact detector adapted to produce a contact signal upon detection of contact of the grinding wheel with a workpiece; a non-grinding feed remainder detector including a counter for counting feed control distribution pulses to detect the remainder of a preset feed amount at least in a non-grinding mode from a variation in the count value of the counter during a period between a time point of starting the non-grinding mode and a time point of receiving the contact signal from the contact detector; and a feed mode changing means adapted to change the feed mode of the grinding wheel in such a manner as to effect the remainder of the non-grinding feed at a speed lower than that of the non-grinding mode in response to the contact signal from the contact detector.

4 Claims, 5 Drawing Figures

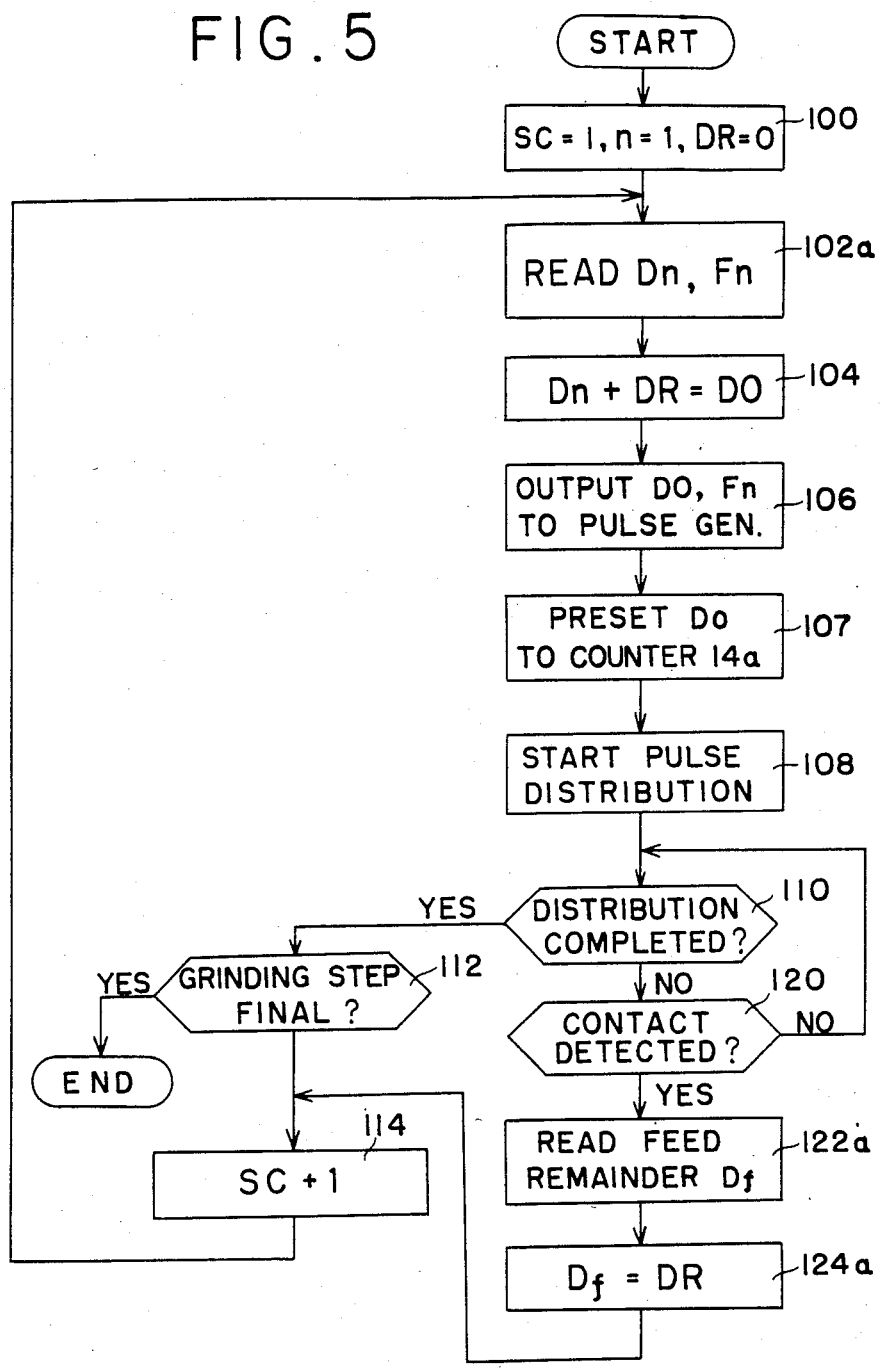

NUMERICALLY CONTROLLED GRINDING MACHINE

BACKGROUND OF THE INVENTION

1. Field of the Invention

This invention relates to a numerically controlled grinding machine permitting the so-called gap eliminating function even in a machining operation feeding a grinding wheel on the basis of a relative feed amount (relative displacement) in each feed mode without using a sizing device.

2. Description of the Prior Art

When classified in terms of the feed speed of the grinding wheel, the conventional numerically controlled grinding machines have a number of feed modes such as "fast forward," "non-grinding," "rough grinding," "fine grinding," and "fast back." From the standpoint of machining accuracy, it is desirable to contact a workpiece during operation in the mode of rough grinding, and therefore it has been the general practice to drop the feed speed to that of the rough grinding mode long before the time point of the contact with a workpiece. Consequently, this method has a drawback that the machining cycle becomes lengthy. In order to overcome this drawback, it has been attempted to shorten the machining cycle by adding the so-called gap eliminating function, feeding the grinding wheel in the non-grinding mode up to a point close to a workpiece and immediately dropping the feed speed to the rough grinding mode upon detection of the contact with the workpiece.

However, the gap eliminating function essentially requires provision of a sizing device thereby to determine the timing of switching the feed speed and measuring the outer diameter of a workpiece until the ultimate finish size is obtained. In case of a workpiece of a stepped shape, it is the usual practice to machine a first machining surface of the workpiece by the use of a sizing device and to machine a second surface on the basis of relative dimensions without using a sizing device in order to enhance the machining speed.

However, in case of grinding the second machining surface by the method based on the relative feed of the grinding wheel in each feed mode without resorting to a sizing machine, it is difficult to use the gap eliminating function. This is because the feed amount for a remaining portion of the feed for the non-grinding mode is cancelled, and the feed after that is controlled according to the predetermined feed amount for each feed mode, inviting an error in the final dimensions in a degree corresponding to the cancelled feed portion.

SUMMARY OF THE INVENTION

This invention aims at the elimination of the above-discussed drawbacks or problems, and its object is to realize the gap eliminating function even in a numerically controlled grinding machine which is adapted to perform a machining operation by the relative feed control in the respective feed modes without using a sizing device, thereby to attain higher machining speed and higher precision.

According to the present invention, there is provided a numerically controlled grinding machine of the type which is arranged to perform a machining operation by relative feed control in which the feed amount in each one of the feed modes of different speeds is specified as a relative amount without using a sizing device, the grinding machine comprising in combination: a contact detector adapted to produce a contact signal upon detection of contact of the grinding wheel with a workpiece; a non-grinding feed remainder detector including a counter for counting input grinding wheel feed control pulses, adapted to determine the remainder of a predetermined feed amount in a non-grinding mode on the basis of a variation in the count number at least in a period from a start point of the non-grinding mode to a time point when a contact detection signal is received from the contact detector; and a feed mode changing means adapted to feed the grinding wheel at a speed lower than the non-grinding mode by an amount corresponding to the remainder of the non-grinding feed detected by the non-grinding feed remainder detector, upon receipt of the contact signal from the contact detector.

A feature of the present invention resides in that, when the contact between the grinding wheel and a workpiece is detected during operation in the non-grinding mode, the feed control of the grinding wheel is changed in such a manner as to effect the remainder of the feed in the non-grinding mode is effected at a speed lower than the non-grinding mode. Typically, the feed is controlled to the speed of the next feed mode, namely, to that of the rough grinding mode. That is to say, the remainder of the feed in the non-grinding mode is added to the feed in the rough grinding mode.

The above-mentioned counter is reset on entering the non-grinding mode, counting the distribution pulses until the time point when a contact detection signal is received, thereby to detect the feed amount until the contact. The remainder of the non-grinding feed can thus be obtained by substracting the detected feed amount from the predetermined amount of the non-grinding feed. It is also possible to set the counter at the predetermined amount of the non-grinding feed at the start of the non-grinding mode and to substract the number of the distribution pulse therefrom. In this case, the value of the counter at the time of reception of a contact detection signal directly indicates the remainder of the non-grinding feed.

When the contact between the grinding wheel and a workpiece is detected by the contact detector, the remainder of the predetermined non-grinding feed is detected by the non-grinding feed remainder detector, and the feed mode is changed to a mode of a lower speed by the feed mode changing means to effect the remainder machining at a speed lower than the non-grinding mode. As a result, the gap eliminating function is added to the operation, machining workpieces accurately to required final finish sizes without using a sizing device.

The above and other object, features and advantages of the invention will become apparent from the following description and the appended claims, taken in conjunction with the accompanying drawings which show by way of example a preferred embodiment of the invention.

BRIEF DESCRIPTION OF THE DRAWINGS

In the accompanying drawings:

FIG. 5 is a flow charge of data processing executed by the CPU in the second embodiment.

DESCRIPTION OF PREFERRED EMBODIMENTS

Figure 1:
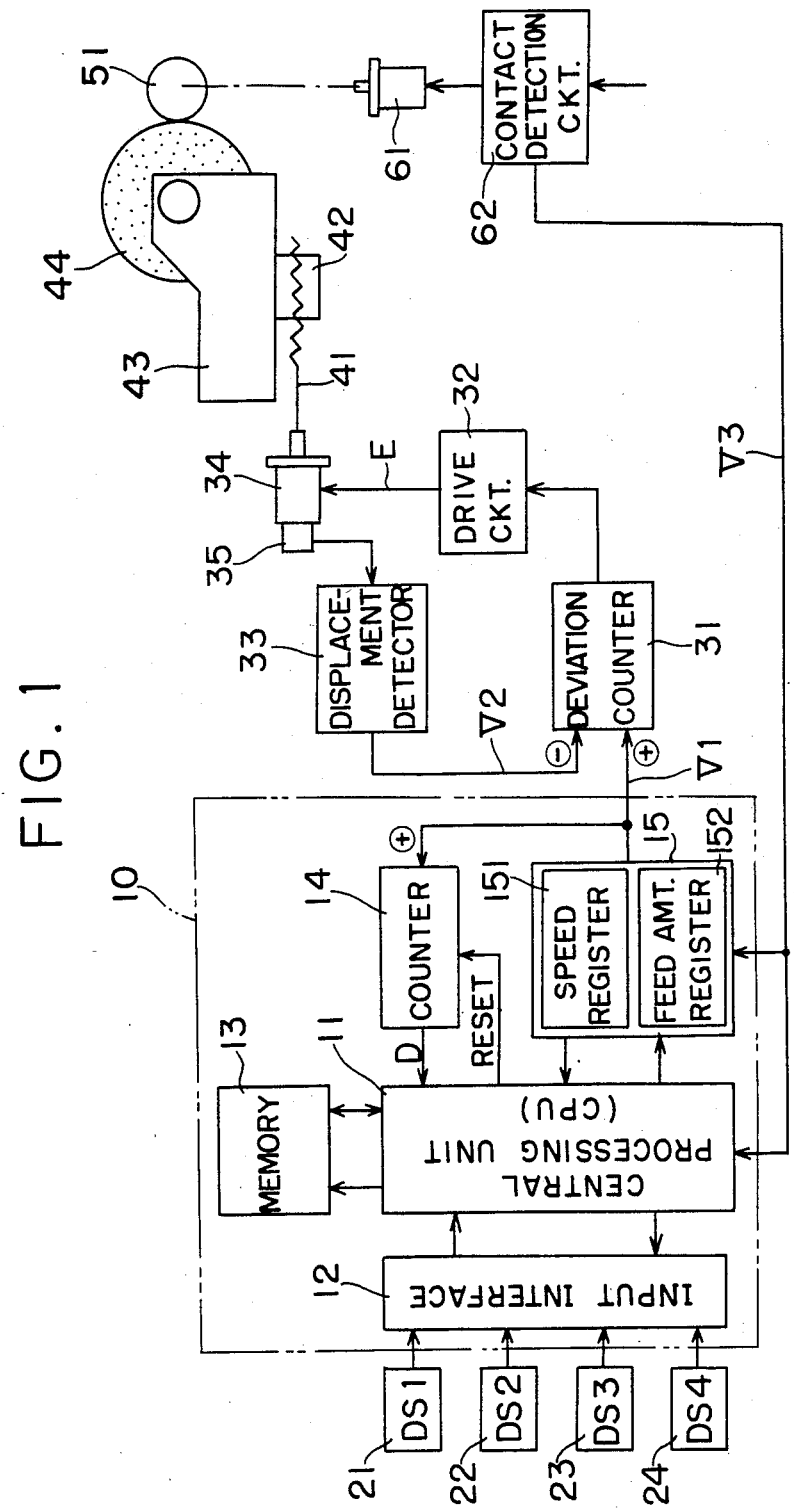
FIG. 1 is a block diagram of a numerically controlled grinding machine embodying the present invention.

Hereafter, the invention is described more particularly by way of a preferred embodiment shown in the drawings. Illustrated in FIG. 1 is a block diagram of a numerical controller employed in one embodiment of the invention, including a main control unit 10 composed of a CPU 11, a memory device 13, an input interface 12, a counter 14, and a pulse generator circuit 15. The input interface 12 is connected to digital switches 21 to 24 for setting the feed modes and the respective feed amounts. For example, the modes of "fast forward," "non-grinding," "rough grinding," and "fine grinding" can be set through these digital switches. The values which are set through these switches are stored in the memory device 13. The pulse generator circuit 15 is provided with a speed register circuit 151 for setting the feed speeds, and a feed amount register 152 for setting the feed amounts.

The counter 14 is reset by CPU 11 upon entering the non-grinding mode to start counting of the distribution pulses V1 from the pulse generator circuit 15.

The grinding wheel is fed under control of a grinding wheel controller, including a deviation counter 31 which is supplied with the distribution pulses V1 from the pulse generator circuit 15, and a drive circuit 32 which applies to a servomotor 34 a voltage E obtained by D/A conversion of the value of the deviation counter 31. The rotational angle of the servomotor 34 is detected by a resolver 35, and feedback pulses V2 corresponding to the rotational angle are fed from a displacement detecting circuit 33 to the deviation counter 31 for subtraction. By operation of this grinding wheel controller, the servomotor 34 is rotated at a speed in synchronism with the period of the distribution pulses by an angle corresponding to the number of the pulses. The servomotor 34 rotates a ball screw 41 to move linerally a ball nut 42 which is in meshed engagement with the ball screw 41. The ball nut 42 which is attached to the grinding head 43 controls back and forth movements of the grinding head 43, on which a grinding wheel 44 is mounted to grind a workpiece 51. The workpiece 51 is rotated by a main spindle motor 61.

The main spindle motor 61 is connected to a contact detection circuit 62 which is arranged to detect the contact between the grinding wheel 44 and a workpiece 51 from the load current flowing through the main spindle motor 61, which increases beyond a threshold value by an increase of load of the main spindle motor 61 when the grinding wheel comes into contact with a workpiece 51. The contact detection signal V3 is sent to CPU 11 and pulse generator circuit 15 as an interruption signal.

Figure 2:
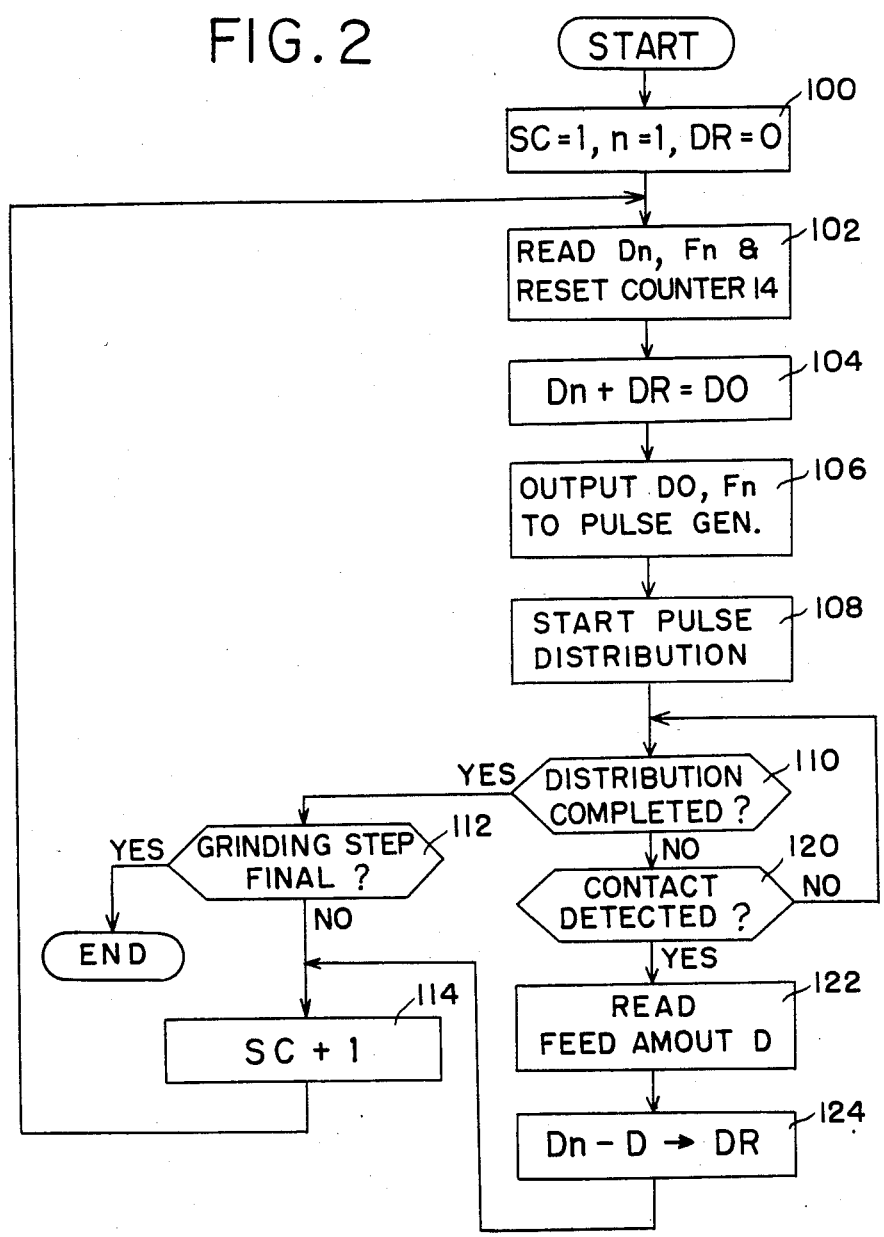
FIG. 2 is a flowchart of data processing by CPU.
Figure 3:
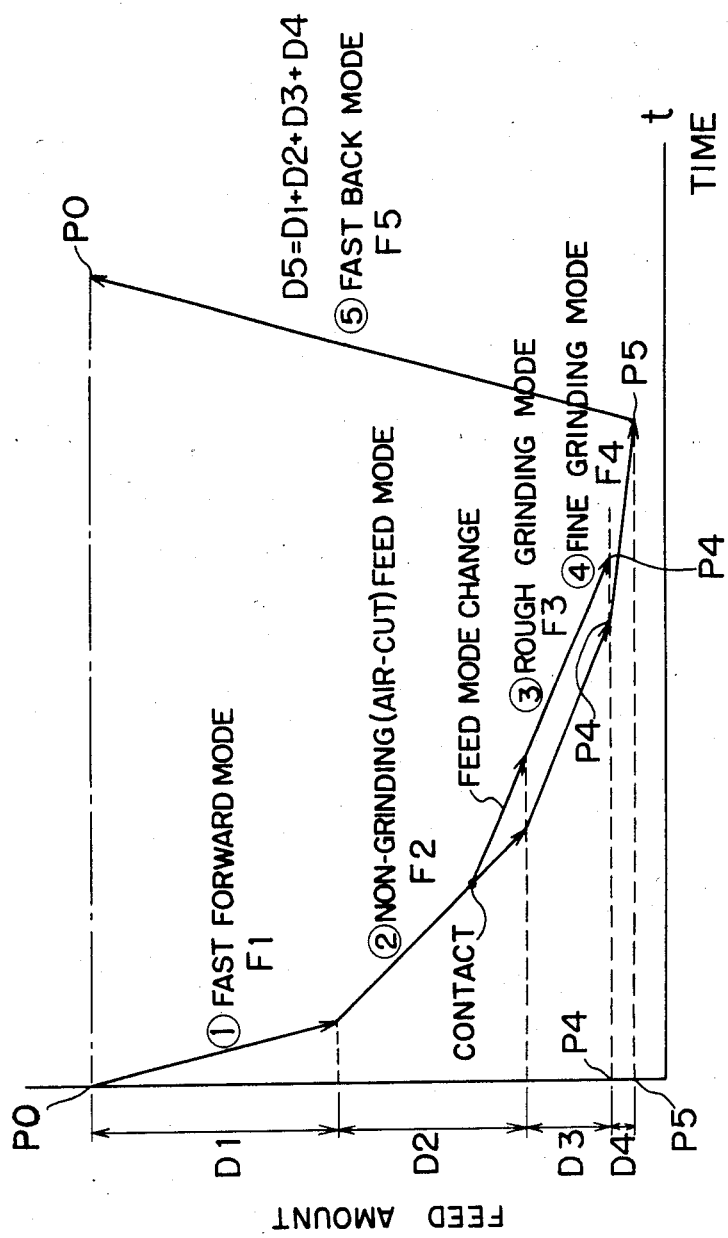
FIG. 3 is a graphic illustration of the characteristics of the respective feed modes.

Shown in FIG. 2 is a flowchart of the data processing by CPU 11, wherein SC denotes a counter which sequentially specifies the cycles of the feed modes for the grinding wheel 44 as indicated by corresponding reference characters in FIG. 3. Indicated at DR is a register which stores the remainder of the non-grinding feed which is detected at a time point when the grinding wheel 44 contacts the workpiece 51. The reference characters Dn and Fn are relative feed amount and speed in an n-th feed mode. The initial value is set in step 100, and the feed amount Dn and feed speed Fn are read in from the table in the memory device 13 sequentially for each cycle (SC, n) of the feed modes. In step 104, the remainder DR of feed in the current mode (non-grinding mode) at the time of receipt of the contact detection signal is added to the feed amount Dn in the next feed mode. The resulting value Do is calculated as a feed amount for the next feed mode. The feed amount Do and feed speed Fn are sent to the pulse generator circuit 15 in step 106, and a pulse distribution start signal is dispatched in step 108, whereupon the pulse generator circuit 15 sends out the distribution pulses V1 to the deviation counter 31 as well as the counter 14, at a period specified by a value stored in the speed register 151 and by a number specified by a value stored in the feed amount register 152.

Whether or not the pulse distribution is complete is detected in step 110 from a return signal from the pulse generator circuit 15. If the pulse distribution is complete, the operation proceeds to step 112, and, for example, if the first "fast forward" mode is complete, the counter SC is updated and the control is returned to step 102 to execute the feed mode of the next cycle. Namely, the feed non-grinding mode is effected in the next cycle.

When the contact is detected by receipt of a contact detection signal V1 in step 120 from the contact detection circuit 62 during operation in the non-grinding mode, the control goes to step 122 to read in the current value D of the counter 14. The value D indicates the amount of the feed which has been effected until the grinding wheel contacted the workpiece during the non-grinding mode. Its difference DR from the initially intended feed amount Dn of the non-grinding mode is calculated in step 124. The operation then proceeds to step 114 to start the next cycle, i.e., the cycle of rough grinding in this case. Namely, the control returns to step 102, and the remainder DR of feed in the non-grinding mode of the second cycle is added to the initially set feed amount Dn of the rough grinding mode in step 104. On the basis of the resulting value Do, the pulse distribution is controlled in step 106. Consequently, the feed amount of the rough grinding mode is corrected to a value greater than the initially set value.

As a result of the above-described feed control, the initial position of the grinding wheel in the fine grinding mode of the next cycle coincides with a preset initial feed position P4 which is determined on the basis of a zero point Po of the grinding wheel 44. Accordingly, the feed in the next cycle is effected up to a preset target value P5 for the fine grinding, and then the fast back mode is executed for return to the zero point Po.

In this manner, it becomes possible to add the gap eliminating function even to an indirectly sizing type grinding machine.

As clear from the foregoing description, the numerically controlled grinding machine according to the present invention includes a contact detector for detecting contact of the grinding wheel with a workpiece, a counter for counting feed control distribution pulses, a non-grinding feed remainder detector for measuring the remainder of feed in a non-grinding mode against a predetermined non-grinding feed amount, and a feed mode changing means adapted to control the feed of the grinding wheel in such a manner as to effect the remainder of the non-grinding feed in a mode of a feed speed lower than that of the non-grinding mode in response to a contact signal from the contact detector.

Thus, the gap eliminating function can be added even to the grinding machines in which the feed amounts in various feed modes are relatively controlled under indirect sizing mode.

Figure 4:
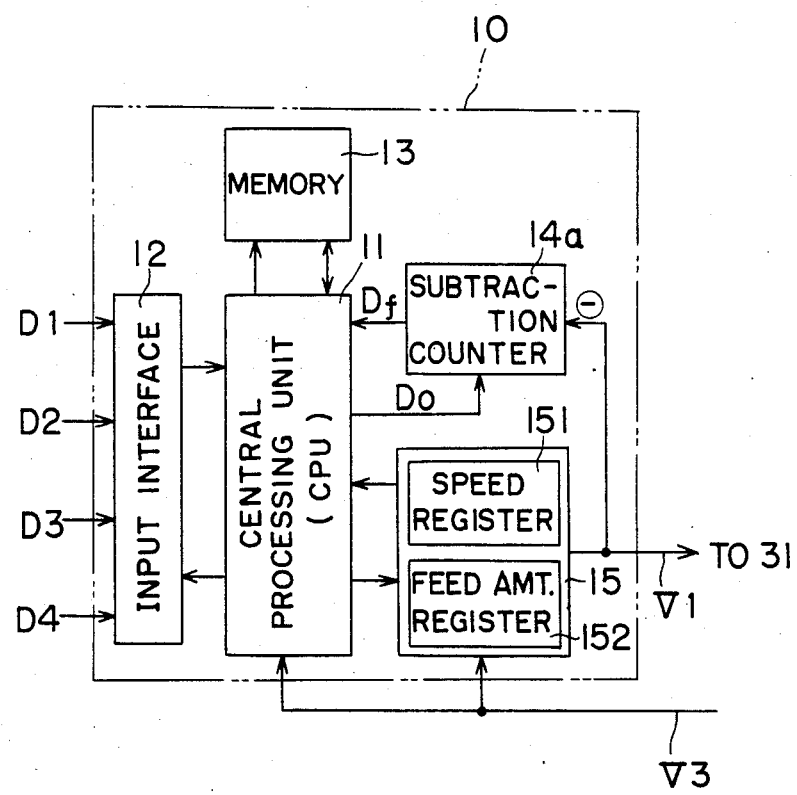
FIG. 4 is a block diagram corresponding to a part of FIG. 1, illustrating a second embodiment of the present invention.

Referring to FIGS. 4 and 5, a second embodiment of the present invention is illustrated having a presettable subtraction counter 14a replaced by the above-noted counter 14. In this particular embodiment, as shown in FIG. 5, step 107 is inserted between the above-noted steps 106 and 108 so as to preset the subtraction counter 14a with the resultant feed amount D0 which is calculated in the above-noted step 104, and feed pulses from the pulse generator circuit 15 are used for subtraction of the preset value D0 in the subtraction counter 14a.

Before the execution of each of the fast forward mode, non-grinding feed mode and the fine grinding feed mode, the resultant feed mount D0 preset in the subtraction counter 14a coincides with a corresponding one of the feed amounts D1, D2 and D4 which are predetermined for those modes. However, when the pulse distribution in the non-grinding feed mode is completed in response to the signal V3 from the contact detection circuit 62, step 120 is followed by step 122a wherein the feed reminder Df stored in the subtraction counter 14a is read, and the value DR is set to indicate the feed reminder Df in step 124a. Thus, prior to the subsequent execution of the rough grinding feed mode, the feed reminder Df is added to the amount Dn, namely to the predetermined feed amount D3 for the rough grinding feed mode. This causes the actual feed amount in the rough grinding feed mode to be extended by the feed reminder Df in the non-grinding feed mode, whereby the same result as in the above-described first embodiment can be realized.

It is to be noted that in either of the first and second embodiments, the contact detection circuit 62 is designed to issue the signal V3 upon the contact of the grinding wheel 44 with the workpiece 51, so that steps 122a and 124a are executed only at the end of the non-grinding feed mode or prior to the rough grinding feed mode.

Obviously, numerous modifications and variations of the present invention are possible in light of the above teachings. It is therefore to be understood that within the scope of the appended claims, the present invention may be practiced otherwise than as specifically described herein.

What is claimed is:

1. A feed controller for a numerically controlled grinding machine wherein a fast forward mode, an air-cut feed mode and a grinding feed mode are sequentially performed to effect relative feed movements between a grinding wheel and a workpiece through different feed amounts at different feed speeds, respectively, said feed controller comprising:

a contact detector for producing a contact signal upon contact of said grinding wheel with said workpiece;

air-cut feed remainder detection means including a counter responsive to feed command pulses for detecting a feed remainder in said air-cut feed mode based upon an air-cut feed amount predetermined for said air-cut feed mode and an actual feed amount through which said relative feed movement in said air-cut feed mode is effected until said contact detector generates said contact signal, each of said feed command pulses being indicative of a unit feed distance in said relative feed movement between said grinding wheel and said workpiece; and feed mode change means responsive to said contact signal from said contact detector for changing the feed mode of said relative feed movement in such a manner as to effect said relative feed movement through said feed remainder at a slower speed than an air-cut feed predetermined for said air-cut feed mode.

2. A feed controller as set forth in claim 1, wherein said feed mode change means includes:

addition means for calculating an extending grinding feed amount by adding said feed remainder detected by said air-cut feed remainder detection means to a grinding feed amount predetermined for said grinding feed mode; and feed speed change means responsive to said contact signal from said contact detector for effecting said relative feed movement in said grinding feed mode through said extended grinding feed amount at a grinding feed speed predetermined to be slower than said air-cut feed speed.

3. A feed controller as set forth in claim 1, wherein said counter is operable to incrementally count said feed command pulses for detecting said actual feed amount of said relative feed movement in said air-cut feed mode, and wherein said air-cut feed remainder detection means further includes:

subtraction means for subtracting said actual feed amount detected by said counter from said predetermined air-cut feed amount so as to detect said feed remainder in said air-cut feed mode.

4. A feed controller as set forth in claim 1, wherein said counter is constituted by a presettable subtraction counter capable of subtracting a preset value stored therein by said feed command pulses, and wherein said air-cut feed remainder detection means further includes:

data preset means for presetting said subtraction counter with said predetermined air-cut feed amount prior to the execution of said air-cut feed mode.

* * * * *